United States Patent [19]

Bruder

[11] 3,941,548

[45] Mar. 2, 1976

[54] INJECTION MOLD ASSEMBLY

[76] Inventor: Robert G. Bruder, 20160 E. Juanita St., Glendora, Calif. 91740

[22] Filed: Oct. 16, 1974

[21] Appl. No.: 515,439

[52] U.S. Cl. . 425/450.1; 425/451.2; 425/DIG. 223; 249/168; 425/444; 425/451.6
[51] Int. Cl.[2] ........................ B29F 1/06; B29F 1/14
[58] Field of Search........... 425/450.1, 451.2, 451.3, 425/451.4, 451.5, 451.6, 451.7, 451.9, DIG. 221, DIG. 222, DIG. 223, 242, 247, 249, 250, 436, 438, 441, 444, 234, 338; 249/67, 68; 18/306

[56] References Cited
UNITED STATES PATENTS

| | | | |
|---|---|---|---|
| 2,558,027 | 6/1951 | Wilson | 425/250 R X |
| 2,850,766 | 9/1958 | Press et al. | 425/441 X |
| 3,141,192 | 7/1964 | Benedetto | 425/451 |
| 3,507,012 | 4/1970 | Aoki | 425/242 |

Primary Examiner—J. Howard Flint, Jr.
Attorney, Agent, or Firm—Boniard I. Brown

[57] ABSTRACT

An injection mold assembly having mold members which are movable relative to one another between closed molding positions to permit injection molding of parts within mold cavities formed by the members and open positions to permit removal or ejection of the molded parts from the cavities. The mold members are interconnected by hydraulically interconnected and powered actuator means which effect opening and closing movement of the mold members in unison. The described mold assembly includes outer mold members comprising core plates having cores which project into cavities in a central mold member to to form the mold cavities when the mold is closed and stripper plates between the central member and core plates. The hydraulic actuator means interconnect the core and stripper plates and central mold member in such a way that full opening movement of the stripper plates relative to the core plates is delayed during opening of the mold assembly to delay stripping of molded articles from the mold cores until sufficient clearance exists between the cores and central mold member to assure dropping of the articles freely from the mold into an article receiving area below the mold assembly.

12 Claims, 10 Drawing Figures

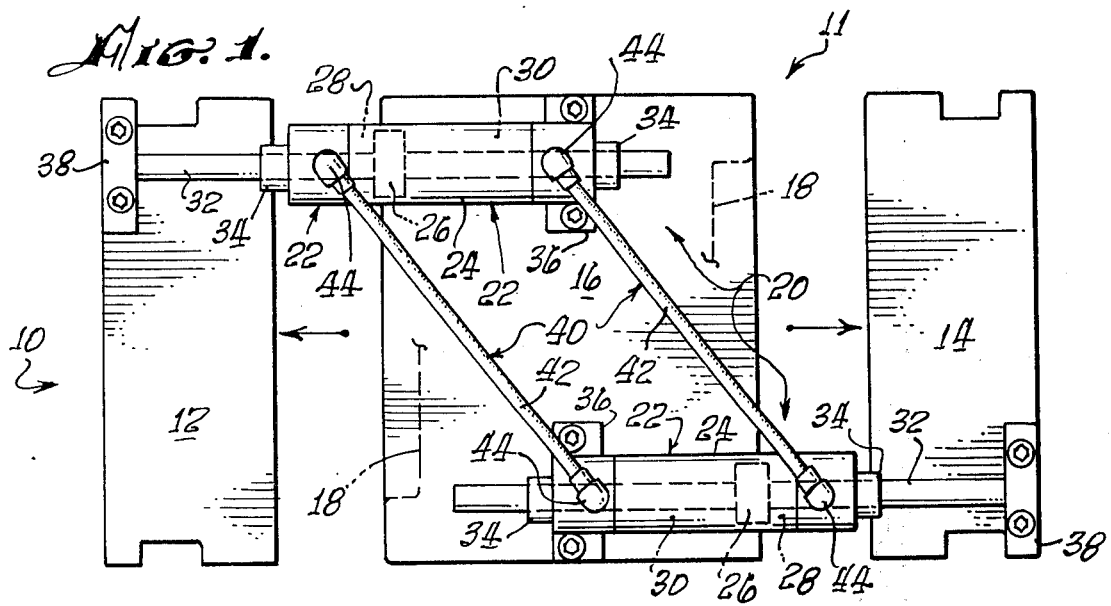
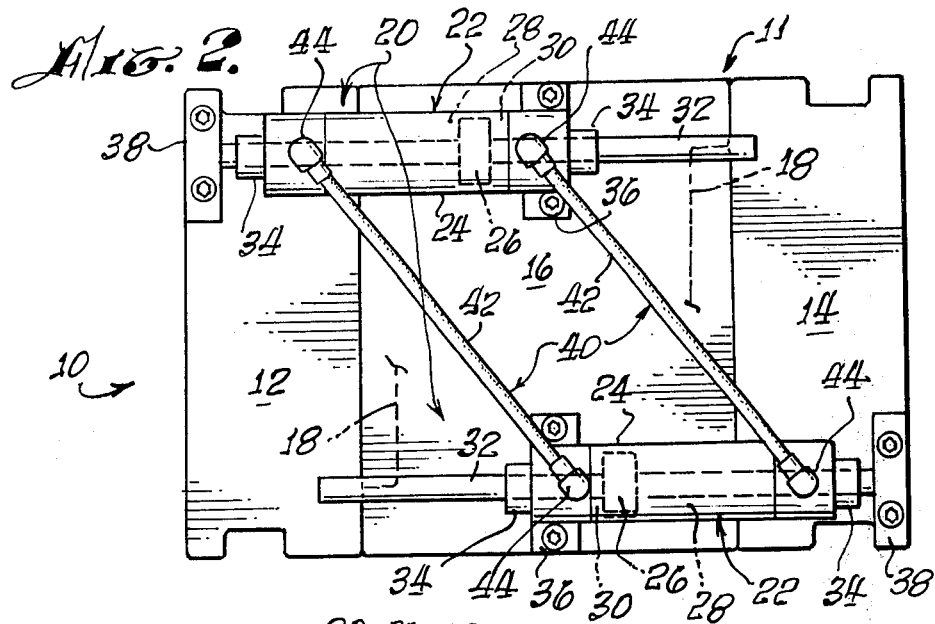
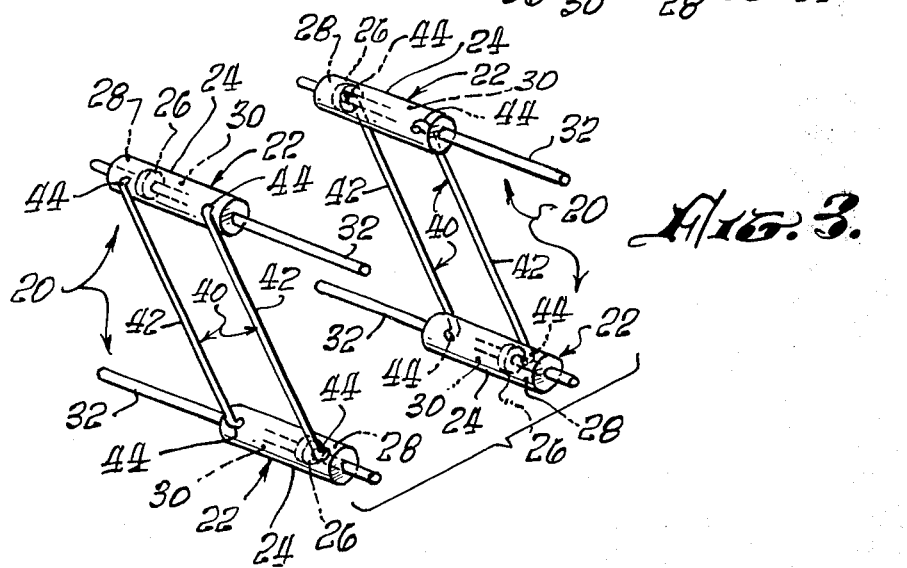

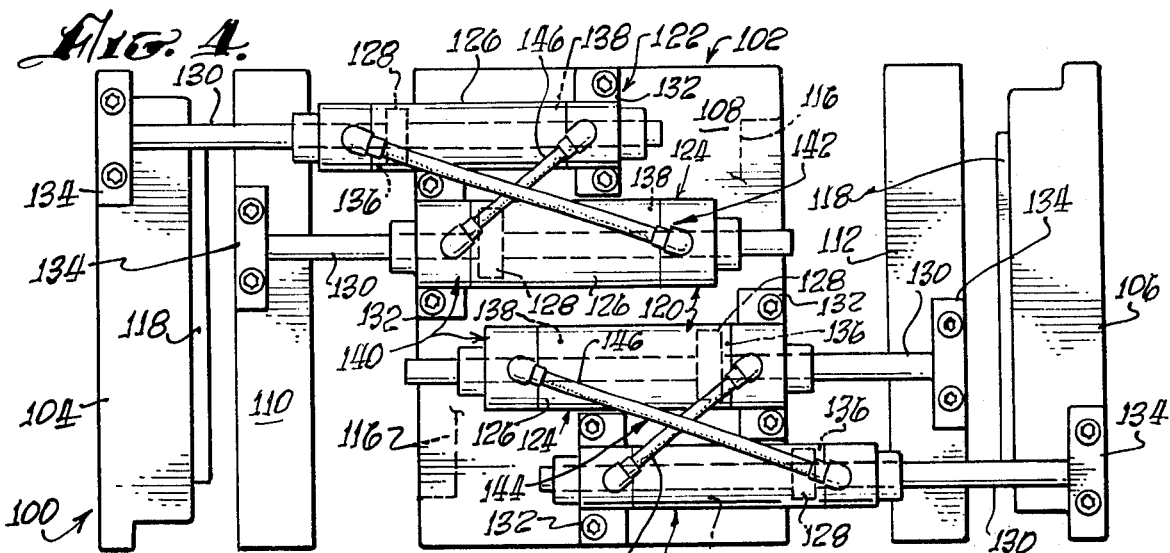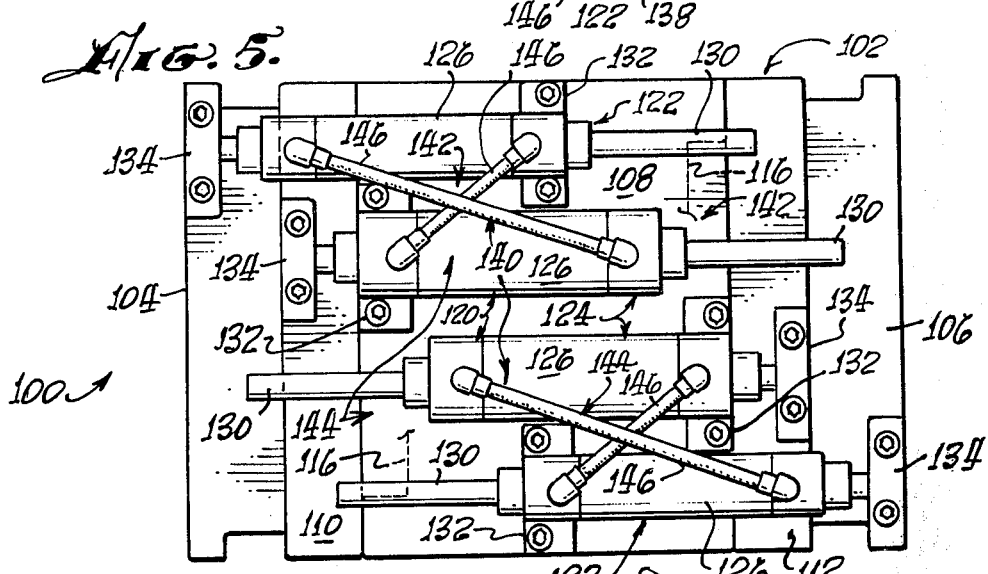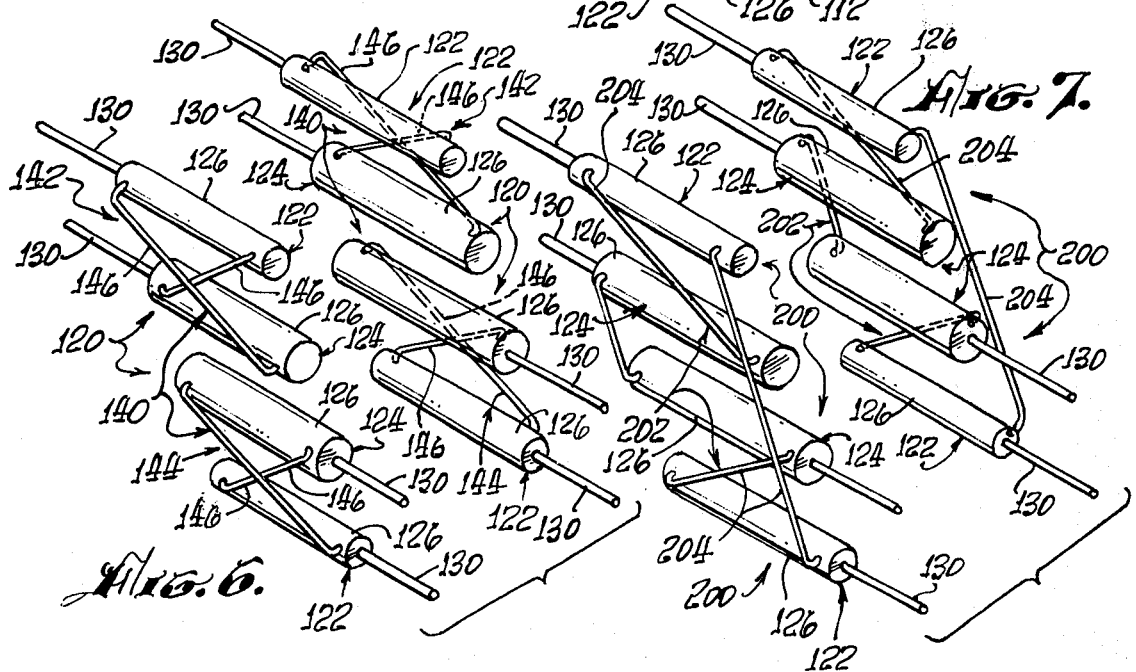

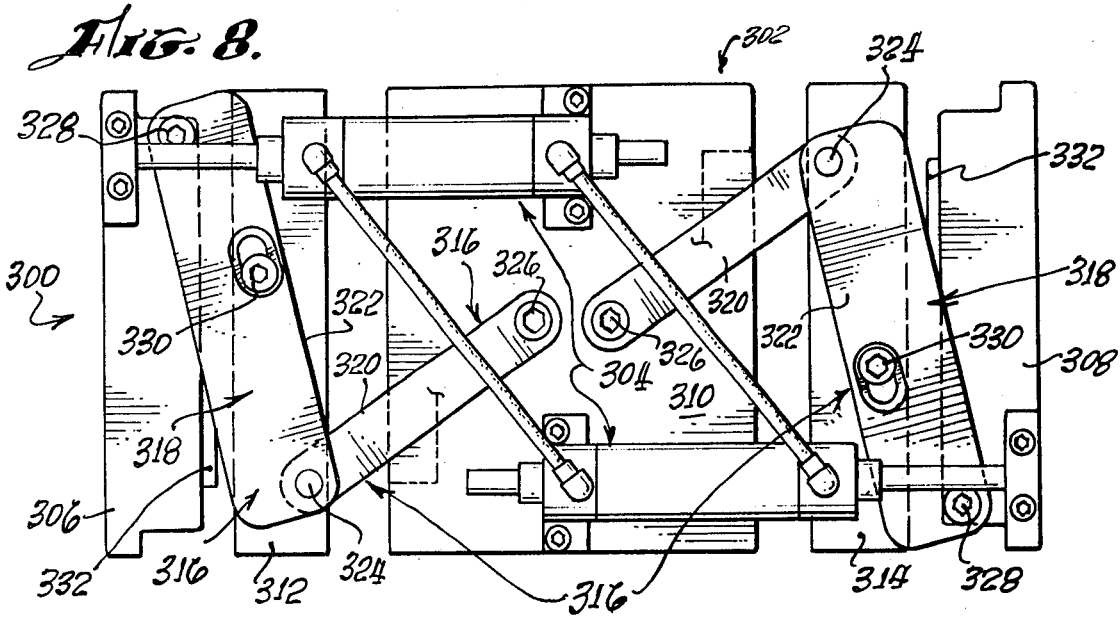
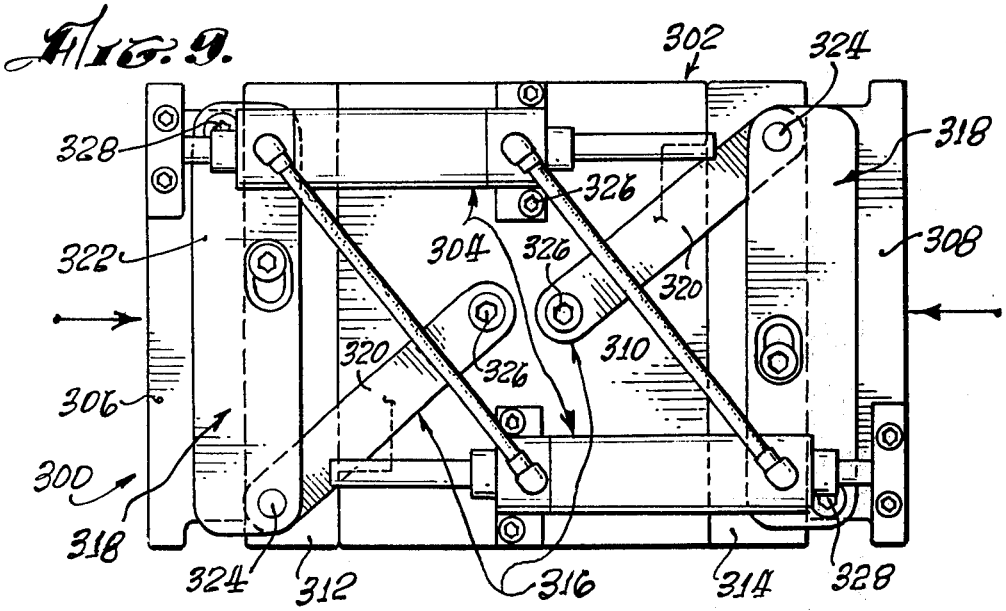
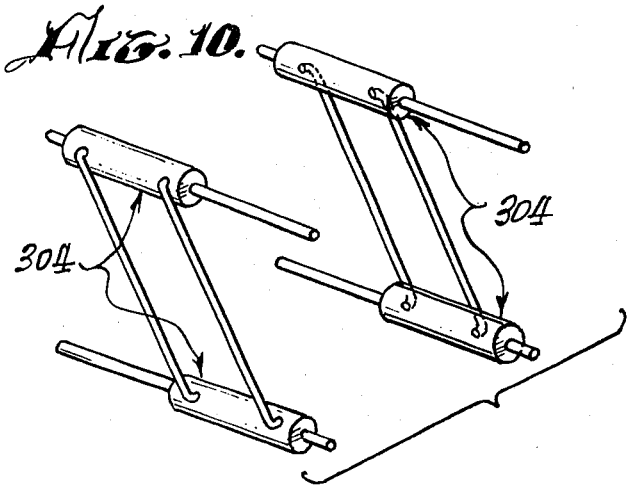

INJECTION MOLD ASSEMBLY

BACKGROUND OF THE INVENTION

1. Field of the Invention

This invention relates generally to the art of injection molding and more particularly to an improved injection mold assembly.

2. Prior Art

One common type of injection mold has a central mold member with opposite faces containing open cavities, core plates at opposite sides of the mold member having cores which project into the cavities to form closed mold cavities when the mold is closed, and stripper plates between the mold member and core plates. During a typical molding cycle, the mold is closed and plastic molding medium is forced into the mold cavities under pressure to fill the space between the cores and the cavity walls. After cooling, the mold is opened by moving the core and stripper plates away from the central mold member. The molded articles adhere to the cores and are retracted with the latter from the mold cavities. The final step of the molding cycle involves ejecting or stripping the molded articles from the cores by moving the stripper plates away from the core plates toward the outer ends of the cores.

Initially, the mold opening and core stripping functions were performed without the aid of any means for positively synchronizing the functions. This method of mold actuation has certain disadvantages. A major disadvantage, for example, resides in the fact that the opening movement of the mold plates, i.e., core and stripper plates, does not occur precisely in unison with the result that some of the medium extruded between the contacting mold surfaces. This extrusion damages the mold and often results in improperly formed molded articles and substantial "flash" on the articles which must be removed. In some cases, this problem was aleviated to some degree by utilizing sophisticated hydraulic and electronic mold actuating and timing systems. However these systems substantially increased the cost and complexity of the molds and molding machines. U.S. Pat. No. 3,767,352 discloses a mechanical linkage arrangement for synchronizing the opening and closing movement of the core and stripper plates. This linkage arrangement also has certain disadvantages, however.

SUMMARY OF THE INVENTION

This invention provides an improved injection mold assembly which avoids the above noted and other deficiencies of the existing injection molds. To this end, the mold members are interconnected by hydraulically interconnected and powered actuating means in such a way that the opening and closing movement of the members are in precise timed relation, and extrusion of the plastic molding medium between the contacting mold surfaces is prevented. In mold assemblies having core and stripper plates, the actuating means also effects delayed stripping movement of the stripper plates during opening of the mold assembly to delay stripping of molded articles from the mold cores until sufficient clearance exists between the cores and central mold member to assure dropping of the articles from the mold into the proper receiving area below the mold.

The present mold assembly is totally self contained and is relatively simple in construction and economical to produce. The mold also produces superior molded parts and avoids damage to the mold members by plastic extrusion between the mold surfaces.

BRIEF DESCRIPTION OF THE DRAWINGS

FIG. 1 illustrates an injection mold assembly according to the invention in its open configuration;

FIG. 2 is a view similar to FIG. 1 with the mold assembly closed;

FIG. 3 illustrates the hydraulic actuating means embodied in the mold assembly;

FIG. 4 illustrates a modified mold assembly in its open configuration;

FIG. 5 illustrates the mold assembly of FIG. 4 in its closed configuration;

FIG. 6 illustrates the hydraulic actuating means for the mold assembly in FIGS. 4 and 5;

FIG. 7 illustrates a modified hydraulic actuating means for the mold assembly of FIGS. 4 and 5;

FIG. 8 illustrates a modified mold assembly in its open configuration;

FIG. 9 illustrates the mold assembly of FIG. 8 in its closed configuration;

FIG. 10 illustrates the hydraulic actuating means for the mold assembly in FIGS. 8 and 9.

DESCRIPTION OF THE PREFERRED EMBODIMENT

Referring first to FIGS. 1–3, the illustrated injection mold assembly 10 has a mold set 11 including outer mold members 12, 14 and a central mold member 16 between the outer members. Mold members 12, 14, 16 are movable relative to one another between their open positions of FIG. 1 and their closed molding positions of FIG. 2. In their closed molding positions, the mold members are disposed in face to face contact and form mold cavities 18 into which a molding medium is injected through passages (not shown) to mold parts in the cavities. In open configuration, the mold members are spaced from one another to permit removal or ejection of the molded parts from the mold cavities. In use, the mold set 11 is installed in a molding machine with one outer mold member 12, 14 secured to a fixed bolster and the other outer member secured to a hydraulic ram which moves toward the bolster to close the mold set to its closed molding configuration of FIG. 2 and away from the bolster to open the mold set to its open configuration of FIG. 1.

According to the present invention, the mold members 12, 14, 16 are interconnected by hydraulically interconnected and activated actuating means 20 for effecting opening and closing movement of the outer members 12, 14 relative to the central member 16 in unison during opening and closing of the mold set 11 to avoid extrusion of plastic molding medium between the contacting mold surfaces due to uneven opening movement of the mold members. Hydraulic actuating means 20 comprises a pair of double acting hydraulic actuators 22 of equal displacement each interconnecting the central mold member 16 and one outer mold member 12, 14. Each actuator has a hollow body 24 containing a movable pressure wall 26 which forms with the body a pair of hydraulic fluid chambers 28, 30 that expand and contract as the body and pressure wall undergo relative movement. In the particular embodiment illustrated, the actuator bodies 24 are hydraulic cylinders, and the pressure walls 26 are pistons fixed to rods 32 which extend slidably through and are sealed to bearings 34 at the cylinder ends. Cylinders 24 parallel the direction line of opening and closing movement of the mold members 12, 14, 16 and are secured by brackets 36 to the central mold member 16. Piston rods 32 are secured by brackets 38 to the outer mold members 12, 14, respectively. As shown in FIG. 3, the actuating means illustrated in FIGS. 1 and 2 are repeated at the opposite or rear side of the mold set 11.

It will be evident from FIGS. 1 and 2 that during closing movement of the mold members 12, 14, 16 from their open positions of FIG. 1 to their closed molding positions of FIG. 2, the fluid chambers 28 of actuators 22 expand and the actuator chambers 30 contract. During opening movement of the mold members from their closed positions of FIG. 2 to their open positions of FIG. 1, the chambers 28 contract and the members 30 expand.

The two hydraulic actuators 22 of each actuating means 20 are hydraulically interconnected by fluid conductor means 40 which communicates each fluid chamber 28, 30 of each actuator to the opposite chamber of the other actuator. That is to say, the conductor means communicates the chamber 28 of each actuator to the chamber 30 of the other actuator. The particular conductor means shown comprise two separate hydraulic fluid conduits or lines 42, such as tubes or hoses, which are secured by end fittings 44 to the actuator cylinders 24. The left hand fluid conduit in FIGS. 1 and 2 communicates the fluid chamber 28 of the upper actuator to the chamber 30 of the lower actuator. The right hand fluid conduit communicates the fluid chamber 30 of the upper actuator to the chamber 28 of the lower actuator.

The hydraulic actuators 22 and conduits 42 are filled with hydraulic cluid which is displaced back and forth from the actuator to the other during opening and closing of the mold sets 11 to effect opening and closing movement of the mold members 12, 14, 16 in unison. In this regard, it is significant to recall that the mold set 11 is installed in a molding machine between a fixed bolster and a movable ram with one outer mold member 12, 14 fixed to the bolster and the other outer member fixed to the ram. During closing movement of the mold set from its open configuration of FIG. 1 to its closed molding configuration of FIG. 2 by extension of the molding machine ram toward the fixed bolster, hydraulic fluid is displaced from the contracting chamber 30 of each actuator 22 to the expanding chamber 28 of the other actuator. Since the actuators have equal displacement, the fluid displaced from one actuator to the other equals the fluid displaced from the latter actuator to the former. A similar but reverse action occurs during opening movement of the mold set from its closed molding configuration of FIG. 2 to its open configuration of FIG. 1. Thus, during such opening movement of the mold set, hydraulic fluid is displaced from the then contracting chamber 28 of each actuator to the expanding chamber 30 of the other actuator.

It will now be understood, therefore, that the mold members 12, 14, 16 are effectively hydraulically interlocked in a manner which positively synchronizes the relative movements of the two outer mold members 12, 14 with respect to the central mold member 16. Accordingly, the two outer members undergo opening and closing movement relative to the central mold member precisely in unison. The problems, mentioned earlier in the prior injection mold assemblies are thus avoided.

Turning now to FIGS. 4-6, the illustrated injection mold assembly 100 has a mold set 102 including two outer mold members 104, 106, a central mold member 108, and additional mold members 110, 112 between the central and outer mold members. The central mold member 108 has cavities 116 entering its right and left hand faces and opening toward the outer mold members 104, 106 respectively. These outer mold members are core plates having cores 118 which enter the cavities 116, when the mold set is closed, to form mold cavities. The intervening additional mold members 110, 112 are stripper plates having openings which slidably receive the cores 118. When the mold set is closed, these stripper plates are clamped firmly between the central and outer mold members, or core plates, and close the outer ends of the mold cavities to permit injection molding of parts in the cavities. When the mold set is opened, the molded parts adhere to the core plate cores 118 and are withdrawn with the latter from the cavities 116 in the central mold member. The stipper plates 110, 112 ae then moved away from the core plates, along the cores to strip or eject the molded parts from the cores.

As noted earlier, one problem involved in this molding operation is assuring sufficient opening movement of the outer core plates 104, 106 to fully withdraw their cores 118 from the cavities 116 in the central mold member 108 before stripping the molded parts from the cores so as to enable the parts to drop freely into a receiving area below the mold set. This delayed stripping action is accomplished by delayed movement of the stripper plates 110, 112 through their stripping strokes. The mold assembly 100 of FIGS. 4-6 includes hydraulically interconnected and activated actuating means 120 for effecting opening and closing movement of the mold members 104, 106, 110, 112, i.e., core and stripper plates, relative to the central mold member 108 in precise synchronism in a manner such that full stripping movement of the stripper plates relative to the core plates is delayed during opening movement of the mold set sufficiently long to assure retraction of the core plate cores 118 from the central mold member cavities 116.

Actuating means 120 comprise double acting hydraulic activators 122, 124 each interconnecting the central mold member 108 and one mold plate 104, 106, 110, 112. Actuators 122, 124, like the actuators in FIGS. 1-3, have hollow bodies 126 in the form of hydraulic cylinders and pressure walls 128 in the form of pistons movable in the cylinders and fixed to piston rods 130 which extend slidably through and are sealed to the cylinder ends. Cylinders 126 are secured by brackets 132 to the central mold member 108. The piston rods 130 are secured by brackets 134 to the respective mold plates 104, 106, 110, 112.

It will be observed in FIGS. 4-6 that the actuators 122 interconnect the central mold member 108 and the core plates 104, 106. Actuators 124 interconnect the central mold members and the stripper plates 110, 112. Each actuator has a first hydraulic fluid chamber 136 which expands during closing movement of the mold set 102 from its open position of FIG. 4 to its closed molding configuration of FIG. 5 and contracts during opening movement of the mold set from its closed molding configuration to its open configuration, and a second hydraulic fluid chamber 138 which contracts during closing of the mold set and expands during opening of the mold set.

The hydraulic actuators 122, 124 are hydraulically interconnected in pairs by fluid conductor means 140.

Thus, the two actuators which connect the central mold member 108 and the two left hand core and stripper plates 104, 110 in FIGS. 4 and 5 are hydraulically interconnected by conductor means 140 to form one actuator pair 142. The two actuators which connect the central mold member and the two right hand core and stripper plates are interconnected by additional conductor means 140 to form a second actuator pair 144. As in the mold assembly of FIGS. 1-3, the fluid conductor means 140 comprise hydraulic fluid conduits or lines 146, such as tubes or hoses, which communicate each fluid chamber 136, 138 in each actuator of each actuator pair to the opposite chamber of the other actuator of the respective actuator pair. Thus, one conduit 146 of each actuator pair communicates the fluid chamber 136 of actuator 122 to the fluid chamber 138 of the other actuator 124 of the pair, and the other conduit communicates the fluid chamber 138 of actuator 122 to the fluid chamber 136 of actuator 124. As shown in FIG. 6, the actuator arrangement illustrated in FIGS. 4 and 5 is repeated in the opposite or rear side of the mold set.

It will now be understood, therefore, that during opening and closing movement of the mold set 102, hydraulic fluid is displaced back and forth between the two actuators 122, 124 of each actuator pair 142, 144 to effect opening and closing movement of the core and stripper plates 104, 106, 110, 112 in timed relation to one another. In this regard, it will be understood that the mold assembly 100 is installed in a molding machine in the same manner as the mold assembly of FIGS. 1-3, with one core plate 104, 106 secured to the machine bolster and the other core plate secured to the machine ram.

As noted earlier, one problem encountered in mold assemblies utilizing cores and stripper plates is delaying or retarding full stripping motion of the stripper plates sufficiently long to insure retraction of the cores from the mold cavities before stripping of the molded parts. In the particular mold assembly 100 under discussion, this is accomplished by providing the stripper plate actuator 124 of each actuator pair 142, 144 with a greater displacement than the core plate actuator 122 of the respective pair. In a typical mold assembly according to the invention, for example, the core plate actuators 122 may have an effective displacement area (i.e., cylinder bore cross-sectional area minus piston rod cross-sectional area) of 0.982 square inches and the stripper plate actuators an effective displacement area of 1.406 square inches.

It will now be understood that during opening and closing of the mold set 102, hydraulic fluid is displaced from the core plate actuators 122 to the stripper plate actuators 124 to effect relative opening and closing movement of the stripper plates 110, 112 with the core plates 104, 106 with respect to the central mold member 108. Because of the larger displacement areas of the stripper plate actuators 124, the stripper plates 110, 112 move through a shorter distance and at a slower velocity than the core plates. According to this invention, the displacement areas of the actuators 122, 124 are so proportioned that during opening of the mold set 102, the relative opening or stripping travel of the stripper plates 110, 112 with respect to their core plates 104, 106 necessary to strip the molded parts from the core plate cores 118 does not occur until after the cores have withdrawn from the mold cavities 116 sufficiently to permit the parts to drop freely into the part receiving area below the mold assembly.

It is apparent that in the mold assembly 100 of FIGS. 4-6, the actuating means 120 synchronizes only the opening and closing movements of core plates 104, 106 and their respective stripper plates 110, 112. The actuating means does not synchronize the opening and closing movements of the two core plates and the two stripper plates with respect to one another.

FIG. 7 illustrates a modified actuating means 200 for the mold set 102 which synchronizes both the opening and closing movements of the core plates 104, 106 and their respective stripper plates 110, 112 and the opening and closing movements of the two core plates and stripper plates. This modified actuating means is identical to that of FIGS. 4-6 except for the manner in which the actuators 122, 124 are hydraulically interconnected by the fluid conductor means 202. Thus, in FIG. 7, the fluid conductors 204 hydraulically interconnect chambers 136, 138 of the upper core plate actuator 122 to chamber 138 of the adjacent stripper plate actuator 124 and to chamber 136 of the lower core plate actuator 122, respectively, chamber 136 of the upper stripper plate actuator 124 to chamber 138 of the lower stripper plate actuator, and chamber 136 of the lower stripper plate actuator to chamber 138 of the lower core plate actuator. It is evident from FIG. 7 that the actuating means 200 effects opening and closing of the core plates 104, 106 and their respective stripper plates 110, 112 in timed relation, as does the actuating means of the mold assembly in FIGS. 4-6, and in addition synchronizes the opening and closing movements of the two core plates and two stripper plates.

The modified mold assembly 300 of FIGS. 8-10 has a mold set 302 like that of the mold assembly in FIGS. 4-6 and hydraulically interconnected and activated actuator means 304 like that of the mold assembly in FIGS. 1-3 for effecting opening and closing movement of the mold set core plates 306, 308 in unison relative to the central mold member 310. In this particular embodiment, the mold set stripper plates 312, 314 are actuated through their opening and closing movements in timed relation to those of the core plates 306, 308 by linkage means 316. Linkage means 316 comprises a link set 318 at each side of the mold assembly for each stripper plate. Each link set includes a pair of links 320, 322 pivotally joined end to end by a pivot 324 and at their ends to the central mold member 310 and corresponding core plate 306, 308, respectively, by pivots 326, 328. Link 322 is pivotally attached between its ends to the corresponding core plate by a pivot and slot connection 330. This pivot and slot connection is offset from the center of the link toward its core plate pivot 328.

In use, the mold assembly 300 is installed in a molding machine in the same manner as the earlier described mold assemblies of FIGS. 1-7. During opening and closing of the mold set 302 in the machine, the actuating means 304 operates in the manner explained in connection with FIGS. 1-3 to effect opening and closing of the core plates 306, 308 in unison relative to the central mold member 310. During this opening and closing movement, the link sets 318 operate to effect opening and closing movement of the stripper plates 312, 314 in timed relation to the opening and closing movements of the core plates. Because of the offset of the slot and pivot connections 330 from the centers of the links 322, the stripper plates undergo less opening and closing travel than the core plates and at a slower velocity. The pivot and slot connections are so offset that the stripper plates strip molded parts from the core plate cores 332 during opening of the mold set 302 only after the cores have fully withdrawn from their mold cavities in the central mold member 310.

I claim:

1. An injection mold assembly comprising:
a mold set including at least three mold members movable relative to one another between closed molding positions and open positions,
first hydraulic actuator means connecting a first pair of said members,
second hydraulic actuator means connecting a second pair of said members,
each actuator means comprising hollow body means containing pressure wall means forming with said body means a first hydraulic fluid chamber which expands during opening movement and contracts during closing movement of the respective member pair and a second hydraulic fluid chamber which contracts during opening movement and expands during closing movement of the respective member pair, and
fluid conductor means connecting said actuator means in a manner such that said first chamber of each actuator means communicates with said second chamber of the other actuator means, whereby said member pairs open and close in unison.

2. An injection mold assembly according to claim 1 wherein:
each of said actuator means comprises a double acting actuator having a movable pressure wall and having said first chamber at one side and said second chamber at the other side of said wall.

3. An injection mold assembly according to claim 2 wherein:
each actuator comprises a piston and cylinder.

4. An injection mold assembly according to claim 1 wherein:
said mold set comprises three cavity forming mold members including two outer mold members and a center mold member between said outer mold members,
said first member pair comprises said center member and one outer member, and
said second member pair comprises said center member and the other outer member.

5. An injection mold assembly according to claim 1 wherein:
said mold set comprises a pair of cavity forming mold members and a stripper plate between said cavity forming members,
one of said cavity forming members contains a cavity opening toward the other cavity forming member, said other cavity forming member comprises a core plate having a core which enters said cavity to form a mold cavity in said closed positions of said mold members, and said cavity forming members are spaced in said open positions of said mold members for removal of a molded part from said cavity,
said stripper plate has an opening receiving said core and seats against said cavity forming members in said closed positions of said mold members and is movable from contact with said core plate along said core to an open position adjacent the tip of the core during opening movement of said mold members to strip the molded part from the core,
said first member pair comprises a cavity forming member and said stripper plate, and
said second member pair comprises the two cavity forming members.

6. An injection mold assembly according to claim 6 wherein:
said actuator means are sized to effect opening movement of said core plate with respect to said cavity containing mold member at a given rate of opening movement and to effect opening movement of said stripper plate with respect to said core plate at a slower rate of opening movement.

7. An injection mold assembly according to claim 6 wherein:
one of said actuator means comprises a core plate actuator means connecting said core plate and cavity containing mold member for effecting opening movement of said core plate with respect to said cavity containing mold member at said given rate of opening member and the other actuator means comprises a stripper plate actuator means connecting said stripper plate and cavity containing mold member for effecting opening movement of said stripper plate with respect to said cavity containing mold member at said slower rate of opening movement, thereby to permit retraction of said core from said cavity prior to stripping of a molded part from the core.

8. An injection mold assembly according to claim 7 wherein:
each of said actuator means comprises piston and cylinder means, and
the effective piston area of said core plate actuator means is less than the effective piston area of said stripper plate actuator means.

9. An injection mold assembly comprising:
a mold set comprising a pair of outer movable mold members, a single center mold member between said outer members, and a pair of stripper plates between said center member and said outer members, respectively,
first hydraulic actuator means connecting said center member and each outer member,
second hydraulic actuator means connecting said center member and each stripper plate,
each actuator means comprising hollow body means containing pressure wall means forming with said body means a first hydraulic fluid chamber which expands during opening movement and contracts during closing movement of the respective members and a second hydraulic fluid chamber which contracts during opening movement and expands during closing movement of the respective members, and
fluid conductor means connecting all of said actuator means in a manner such that said first chamber of each actuator means communicates with said second chamber of another actuator means whereby said mold members and stripper plates undergo relative opening and closing movement in unison.

10. An injection mold assembly according to claim 9 wherein:
said actuator means are sized to effect relative opening movement of said outer mold members relative to said center mold member at a given rate of opening movement and to effect opening movement of said stripper plates relative to said center mold member at a slower rate of opening movement.

11. An injection mold assembly comprising:
a mold set including a pair of outer movable mold members, a single center mold member between said outer members, and a pair of stripper plates between said center mold member and said outer members, respectively,
hydraulic actuator means connecting said center member and each outer member,
each actuator means comprising hollow body means containing pressure wall means forming with said body means a first hydraulic fluid chamber which expands during opening movement and contracts during closing movement of the respective members and a second hydraulic fluid chamber which contracts during opening movement and expands during closing movement of the respective members,
fluid conductor means connecting said actuator means in a manner such that said first chamber of each actuator means communicates with said second chamber of the other actuator means, whereby said members open and close in unison, and
linkage means connecting each stripper plate to said center member and the adjacent outer member for effecting opening and closing movement of said stripper plates in timed relation to the opening and closing movement of said mold members.

12. An injection mold assembly according to claim 11 wherein:
said linkage means includes means for delaying full opening movement of said stripper plates relative to said opening movement of said mold members.

* * * * *